United States Patent

Kübert et al.

[11] Patent Number: 5,357,812
[45] Date of Patent: Oct. 25, 1994

[54] WEB STRESS MEASURING ASSEMBLY

[75] Inventors: Thomas Kübert, Karlstadt-Karlburg; Erhard H. Glöckner, Eibelstadt, both of Fed. Rep. of Germany

[73] Assignee: Koenig & Bauer Aktiengesellschaft, Wurzburg, Fed. Rep. of Germany

[21] Appl. No.: 105,958

[22] Filed: Aug. 13, 1993

[30] Foreign Application Priority Data

Aug. 13, 1992 [DE] Fed. Rep. of Germany ....... 4226791

[51] Int. Cl.⁵ .................................................. G01L 1/04
[52] U.S. Cl. ........................... 73/862.451; 73/159
[58] Field of Search ............... 73/862.451, 862.471, 73/862.473, 862.474, 159

[56] References Cited

U.S. PATENT DOCUMENTS

| | | | |
|---|---|---|---|
| 2,323,818 | 7/1943 | Lessmann | 73/862.451 |
| 2,695,519 | 11/1954 | Lodge | 73/862.451 |
| 2,911,823 | 11/1959 | Nistico et al. | 73/862.474 |
| 2,923,150 | 2/1960 | Imboden et al. | 73/862.41 |
| 3,589,181 | 6/1971 | Palmatier et al. | 73/862.474 |
| 3,653,258 | 4/1972 | King | 73/862.474 X |
| 3,845,434 | 10/1974 | Carter | 336/30 |
| 3,950,988 | 4/1976 | Nowisch et al. | 73/862.451 |
| 4,548,085 | 10/1985 | Grundy | 73/862.473 |
| 4,561,580 | 12/1985 | Trail, Jr. | 73/862.474 X |
| 4,899,599 | 2/1990 | Eddens | 73/862.474 X |
| 4,914,960 | 4/1990 | Kordahi | 73/862.451 |
| 5,275,062 | 1/1994 | Turley | 73/862.474 |

FOREIGN PATENT DOCUMENTS 1187096 12/1965 Fed. Rep. of Germany .

Primary Examiner—Richard E. Chilcot, Jr.
Assistant Examiner—Elizabeth L. Dougherty
Attorney, Agent, or Firm—Jones, Tullar & Cooper

[57] ABSTRACT

Stress in a paper web in a rotary printing press is measured by directing the web past two tubular members spaced in the direction of web travel and supported by support arms. Deflection of the support arms is measured and provides an indication of the amount of stress in the paper web.

6 Claims, 3 Drawing Sheets

WEB STRESS MEASURING ASSEMBLY

1. FIELD OF THE INVENTION

The present invention is directed generally to a web stress measuring assembly. More particularly, the present invention is directed to a web stress measuring assembly for a paper web. Most specifically, the present invention is directed to a web stress measuring assembly for measuring stress in a paper web in a web-fed rotary printing press. The paper web is run through the web stress measuring device which is positionable at any suitable point along the path of web travel. The paper web passes over a first tubular element and under a second tubular element. Each of these tubular elements has a plurality of air jets or nozzles to provide an air cushion between the web and the tube's surface. Flex of brackets which support the tubular element is measured and this bracket flexure is utilized to provide an indication of paper web stress.

2. DESCRIPTION OF THE PRIOR ART

It is generally known in the art to provide measurements of the stress or tension in a moving paper web as the web is being printed in a web-fed rotary printing press. Both too much as well as too little paper web tension have an effect on the quality of the printed products produced by the press. In addition, too great a web stress can lead to web breakage or separation with a resultant printing press stoppage.

One prior art device which is used to measure and thus control the tensile stress in a paper web running over rolls is shown in German patent disclosure DE-PS 11 87 096. In this prior art device there is provided an element which is disposed crosswise or transversely to the running direction of the paper web. This element is provided with a plurality of nozzles or bores. The element is connected to a compressed air reservoir by way of a throttle or control valve. The magnitude of the air pressure in the tubular element is a measure of the web stress. This prior art tubular element is embodied as a feeder tube which rotates with the web speed and has a plurality of bores or nozzles disposed uniformly about its periphery. Only those bores which are in actual physical contact with the paper web as it passes over and rotates the tubular element are effective in providing a measurement of the tensile stress on the paper web.

One limitation of this prior art device is that the freshly printed paper web is brought into physical contact with the tubular element of this prior art device and is wrapped around it while causing it to rotate. The freshly printed paper web may transfer some of its ink to the surface of the tubular element and may thereby cause a double image or mackle to be created on the printed web. Such a double image created between the individual printing units of the printing press by the wrapping of the paper web either completely or partially about the rotatable tubular element of the prior art device is clearly not beneficial and reduces printing quality.

It will be apparent that a need exists for a device for measuring web stress which overcomes the limitations of the prior art. The web stress measuring assembly in accordance with the present invention provides such a device and is a significant improvement over the prior art devices.

SUMMARY OF THE INVENTION

It is an object of the present invention to provide a web stress measuring assembly.

Another object of the present invention is to provide a web stress measuring assembly for a paper web.

A further object of the present invention is to provide a web stress measuring assembly for measuring stress in a paper web in a web-fed rotary printing press.

Yet another object of the present invention is to provide a web stress measuring assembly which measures paper web stress in a contactless manner.

Still a further object of the present invention is to provide a web stress measuring assembly which has a high measuring precision.

Even yet another object of the present invention is to provide a web stress measuring assembly which causes only a slight deflection of the paper web out of the web transport direction.

As will be set forth in greater detail in the description of the preferred embodiment which is presented subsequently, the web stress measuring assembly in accordance with the present invention utilizes two spaced tubular elements or pipes which are supported at the free ends of brackets. These brackets are deflected or flexed by the web as the web passes over the first tubular element and under the second tubular element. The deflection or flexure of the brackets is measured or sensed and is utilized to provide an indication of the paper web stress. Each of the tubular elements or pipes has a plurality of air jet nozzles that are supplied with compressed air from a suitable source. This compressed air that is discharged through the air jet nozzles creates an air cushion between the paper web and the tubular elements. This air cushion allows the paper web stress to be measured in a generally contactless manner.

The web stress measuring assembly of the present invention has several significant advantages over the prior art devices. There is a very minimal deflection of the paper web in its path of travel through the tubular members or pipes of the subject measuring assembly. This minimal deflection of the web results in high registration precision in measurement of the web stress. The use of compressed air in the tubular members, providing a contactless passage of the paper web over the tubular members, results in the elimination of smearing of the freshly printed images on the paper web. A high degree of measurement precision is attained by using two separate tubular elements and two load cells for each tubular element. Through the use of the present invention, the travel of the paper web is smoothed while running, thus avoiding double impressions. The measurement device of the present invention can be advantageously used to provide for the automatic execution of control functions or safety functions by comparing the actual web stress values with nominal values by use of a suitable computer. Such a safety function can be executed, for example, in a paper web winder in the case of a paper web tear or break. The web winder can be controlled in response to the sensing of reduced paper web stress due to the web breaks.

The web stress measuring assembly in accordance with the present invention is usable with various web fed printing presses such as jobbing machines, newspaper or telephone directory printing presses and also with flexographic printing presses. The web stress measuring assembly of the present invention overcomes the limitations of the prior art and is a substantial advance in the art.

BRIEF DESCRIPTION OF THE DRAWINGS

While the novel features of the web stress measuring assembly in accordance with the present invention are set forth with particularity in the appended claims, a full and complete understanding of the invention may be had by referring to the detailed description of the preferred embodiment, as set forth subsequently, and as illustrated in the accompanying drawings, in which:

DESCRIPTION OF THE PREFERRED EMBODIMENT

Figure 1:
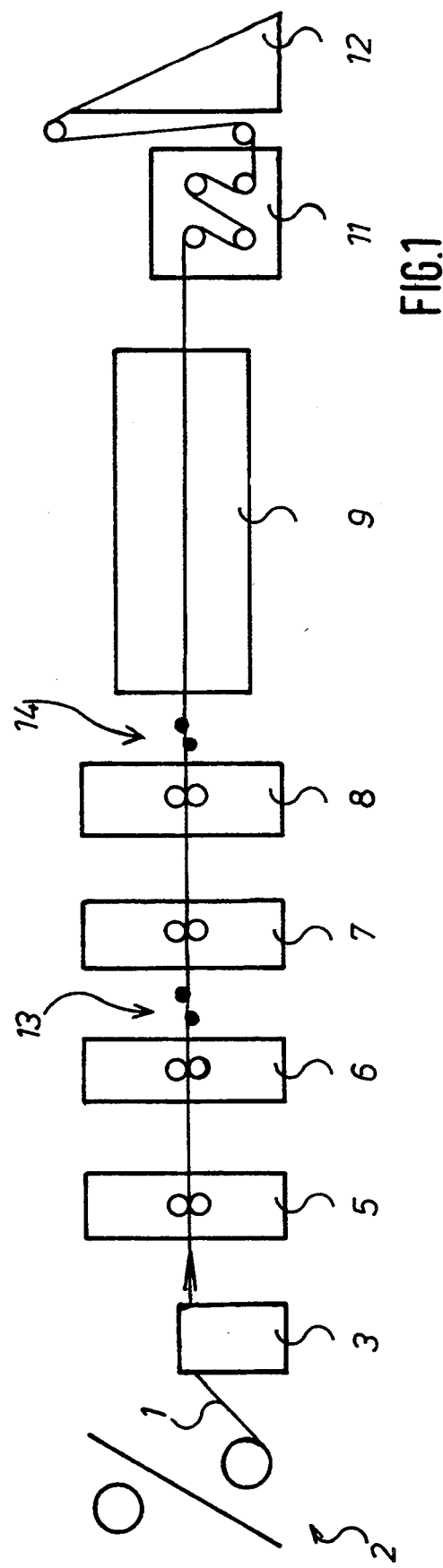
FIG. 1 is a schematic side elevation view of a web-fed rotary printing press which utilizes the web stress measuring assembly of the present invention.

Referring initially to FIG. 1, there may be seen a schematic side elevation view of a web fed rotary printing press, usable for job printing, in which the web stress measuring assembly in accordance with the present invention may be used. In this web-fed rotary printing press, a paper web 1 is fed from a reel changer 2 and passes through a feeder 3 to a plurality of printing units 5, 6, 7 and 8 which are spaced along the path of travel of the paper web 1. The now printed web 1 then passes through a drier 9 and over a cooling segment 11 to a folder 12. Once the web 1 leaves the folder 12, it is further handled in a generally conventional manner. First and second paper web stress measuring assemblies 13 and 14 in accordance with the present invention are placed along the path of web travel between the second and third printing units 6 and 7, and before the drier 9, respectively. It will be understood that these first and second web stress measuring assemblies 13 and 14 are the same and that their position as depicted in FIG. 1 is exemplary of various locations in which these devices could be positioned. Since both of these web stress measuring assemblies 13 and 14 are the same, only the first one 13 will be discussed in detail.

Figure 2:
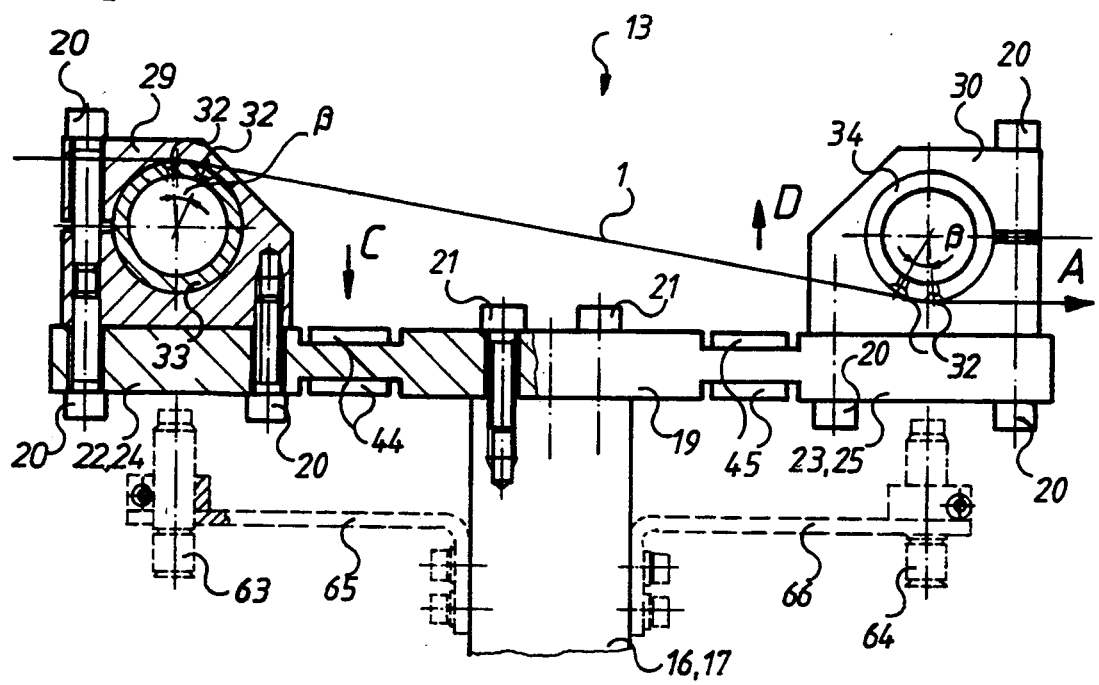
FIG. 2 is a cross-sectional view of a web stress measuring assembly of the present invention and taken along line II—II of FIG. 3.
Figure 3:
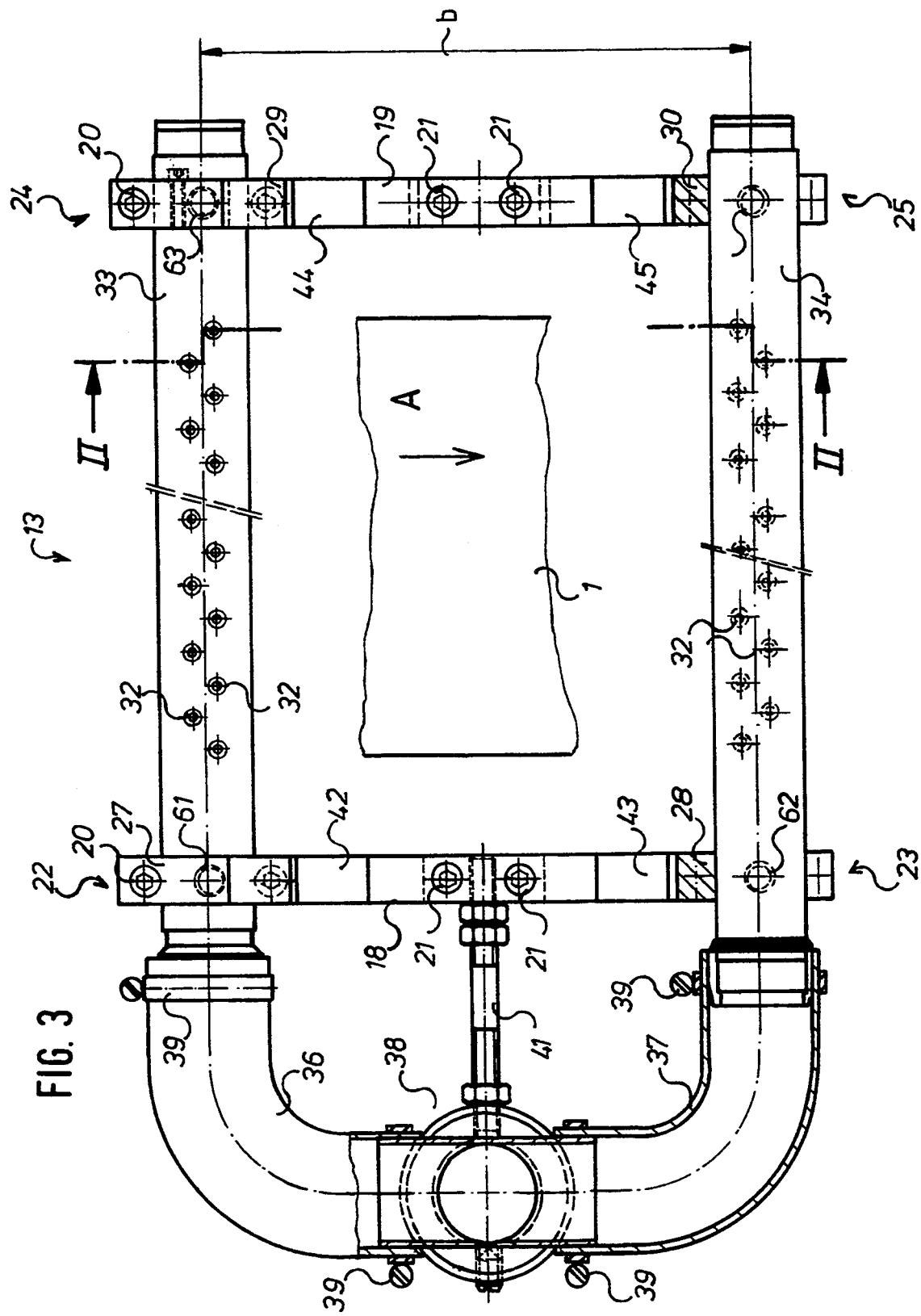
FIG. 3 is a top plan view of the web stress measuring assembly of the present invention.

Turning now to FIGS. 2 and 3, a web stress measuring assembly, generally at 13, in accordance with the present assembly, may be seen in detail. The paper web, whose stress is to be measured, is shown at 1 and its direction of travel is indicated by the arrow A in FIG. 3. A pair of vertically extending, spaced supports 16 and 17, as seen in FIG. 2 extend upwardly from the press frame and are disposed at either side of the path of travel of the web 1. Each support 16 and 17 carries a pair of support arms or brackets 18 and 19 with support arms 18 being attached to support 16 and support arms 19 being attached to support 17 all by the use of suitable screws 21, as may be seen in FIGS. 2 and 3. As may also be seen in FIGS. 2 and 3, a first support arm 18 on support 16 extends generally upstream in the direction of travel of web 1 while a second support arm 18 on support 16 extends downstream in the direction of web travel. The support arms 19 on support 17 are similarly positioned. These two arrangements of supports and support arms thus form two generally T-shaped members which are positioned laterally across the path of travel of web 1 from each other.

The support arms 18 on support 16 have a free upstream end 22 and a free downstream end 23. In a similar manner, the support arms 19 on support 17 have a free upstream end 24 and a free downstream end 25. A first, upstream pipe or tubular member 33 is supported between first clamping holders 27 and 29 one the upstream ends 22 and 24 of the first support arms 18 and 19. A second, downstream pipes or tubular member 34 is supported between second clamping holders 28 and 30 on the downstream ends 23 and 25 of the second support arms 18 and 19. These pipes or tubular members 33 and 34 are disposed with their longitudinal axes generally parallel to the axes of the various printing rollers (not shown) and thus are generally transverse to the path of travel of the paper web 1. The tubular members 33 and 34 are securely held at their ends in their respective clamping holders 27 and 29, and 28 and 30 respectively, in a non-rotatable manner by suitable screws or bolts 20 which are received in the clamping holders, as seen in FIG. 2. As also seen in FIG. 2, the clamping holders 27, 28, 29 and 30 are secured to their respective ends 22, 23, 24 and 25 of the support arms 18 and 19 by similar screws or bolts 20.

Each of the pipes or tubular members 33 and 34 has a double row of radially extending, longitudinally spaced bores or air nozzles 32. These bores extend in a staggered double row in the longitudinal axial direction across the surfaces of tubular members 33 and 34. As may be seen most clearly in FIG. 2, these bores 32 are located only on the contact surfaces of the tubular members 33 and 34 with the paper web 1. As shown in FIG. 2, the bores 32 in the upstream tubular member 33 are thus located on the upper surface of member 33 while the bores 32 in the downstream tubular member 34 are situated at the lower portion of this member. Each tubular member 33 and 34 has a contact surface around which the paper web 1 contacts the surface of the members 33 and 34. The bores 32 are located in this contact surface. Each such contact surface has a circumferential angle $\beta$ of generally 25°, as is shown in FIG. 2.

Referring now primarily to FIG. 3, each of the tubular members 33 and 34 has a sealed first end and is provided with a supply of compressed air at a second end. A generally T-shaped compressed air supply, generally at 38, has first and second air supply hoses or conduits 36 and 37 which extend from the air supply 38 to the second ends of the upstream and downstream tubular members 33 and 34, respectively. These air supply hoses or conduits are securely clamped to their respective tubular members or pipes 33 and 34 and to the T-shaped air supply 38 by appropriate hose clamps or straps 39. The air supply 38 is, in turn, secured to the support 16 by a suitable holding mount 41. The air supply 38 is provided with air under pressure from a suitable compressed air source (not shown) through a suitable control valve, which is also not specifically shown in the drawings. It will be understood that each pipe or tubular member 33 and 34 could be provided with compressed air through its own separately controllable supply hose 36 or 37 thereby eliminating the T-shaped air supply 38. The compressed air, which is supplied to each of the tubular members 33 and 34, exits through the bores or nozzles 32 and thus forms a thin air cushion or air bearing between the surface of the pipes 33 and 34 and the paper web 1. This very thin air cushion is sufficient to allow the paper web 1 to pass by the tubular members 33 and 34 in an essentially contactless manner.

Again referring to FIGS. 2 and 3, each of the support arms 18 and 19 for the web receiving tubular members 33 and 34 carries upper and lower strain gauges 42, 43, 44 and 45. Each of these strain gauges is situated in a correspondingly shaped recess in its support arm 18 or 19 intermediate the center screw fasteners 21, which attach the support arms to the supports 16 and 17, and the clamping holders 27–30 which are disposed at the free ends 22–25 of the support arms 18 and 19. As a consequence of the stress on the paper web 1 as it passes by the tubular members 33 and 34, as shown in FIGS. 2 and 3, the support arms 18 and 19 are flexed slightly in the directions indicated by arrows C and D in FIG. 2. The upstream or first support arms are flexed downwardly since the paper web 1 passes over the first or upstream tubular member 33. The downstream or second support arms are flexed upwardly by the paper web 1 passing beneath the second or downstream tubular member 34. The flexation of the support arms 18 and 19 causes the strain gauges 42–45 to respond by producing an output signal in response.

Figure 4:
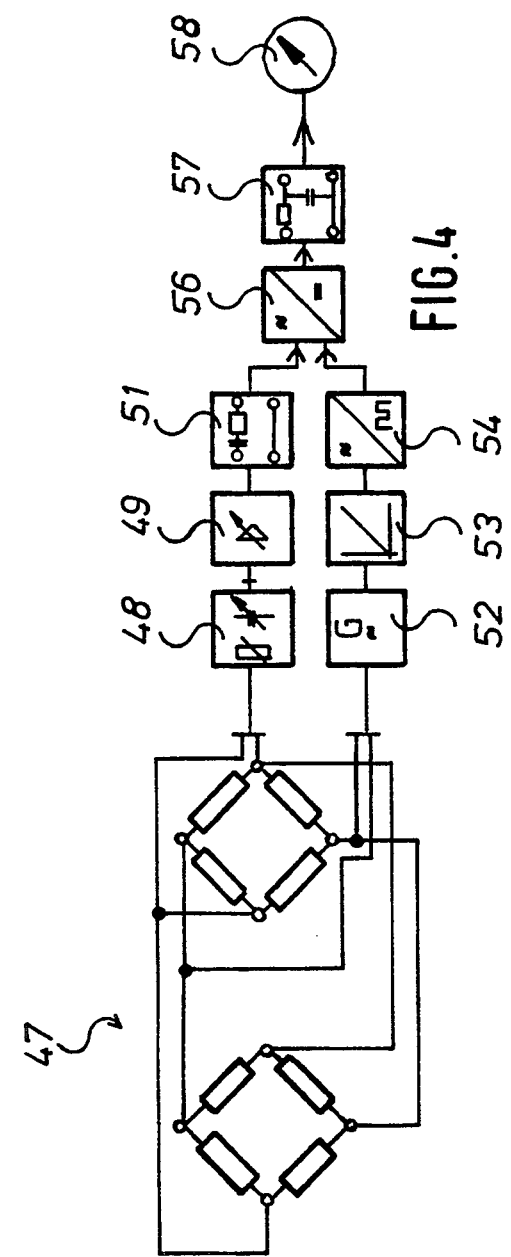
FIG. 4 is an electrical evaluation circuit for use in measuring the stress or strain in the support brackets of the present invention.

An evaluation circuit which is associated with the strain gauges 42–45 may be seen in FIG. 4. This circuit is a known double bridge circuit 47 whose resistors correspond to the strain gauges 42–45. The outputs of the double bridge circuit 47 are connected to an inphase demodulator 56 by way of an RC-alignment element 48, an amplifier 49, a band-pass filter 51 or a frequency generator 52, a 90° phase-shifter 53 and a sine-wave/square wave converter 54. The signal from the inphase demodulator passes through a low pass filter 57 to a display device 58. These elements which receive the outputs from the strain gauges 42–45 are located outside of the web stress measuring device 13 and would be situated in a suitable housing which is not specifically shown in the drawings. The display device 58 can, for example, be located in the press control stand or in another central control point.

Instead of attaching strain gauges 42–45 to the support arms 18 and 19 to measure their flexure, another arrangement of load cells, as depicted in dashed lines in FIG. 2, may be utilized. In this embodiment inductive travel pickup 61–64, are disposed on the ends of holding or support mounts 65 and 66 which are carried by the supports 16 and 17. These inductive travel pickups 61–64 are located on their holding or support mounts 65 and 66 at a fixed distance from the ends 22–25 of the brackets 18 and 19. These pickups 61–64 are connected to generally known carrier frequency measurement amplifiers, which are not shown in the drawings and are supplemented there by precision resistors to make a Wheatstone-type bridge. The initially balanced bridge is detuned by travel of the solenoid plungers of the pickups 61–64 in response to flexure of the support arms 18 and 19 caused by paper web stress. The measurement signals generated by the travel pickups 61–64 is proportional to the plunger displacement and is thus a measurement of the travel of the support arms 18 and 19.

This measurement signal is amplified and processed and can be displayed on a suitable display device. The finding generated by the inductive travel pickups 61–64 is similar to the finding of the strain gauges 42–45 and either can serve as a measure of web stress that can be read off the display device 58. During operation of the web-fed rotary printing press, the press operator, or a suitable computer control assembly, which is not shown in the drawings, can ascertain a mean value for the paper web stress. If the operator notes that the web stress being measured is deviating from this means value, he can initiate suitable measures, such as adjustment of paper web drawing rollers, to correct the paper web stress. Alternatively, the computer control could compare the measured web stress with a set value and could automatically effect suitable steps to correct the paper web tension.

Figure 7:
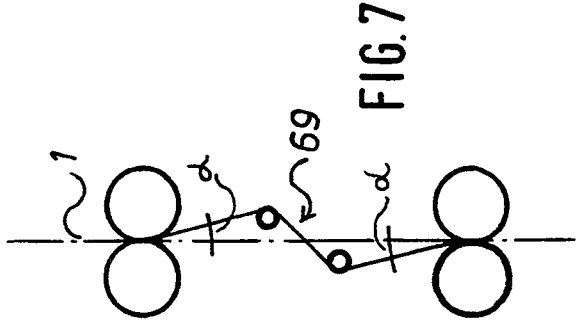
FIG. 7 is a schematic detail view of a portion of the printing press depicted in FIG. 5 and showing the measuring device of the present invention.
Figure 5:
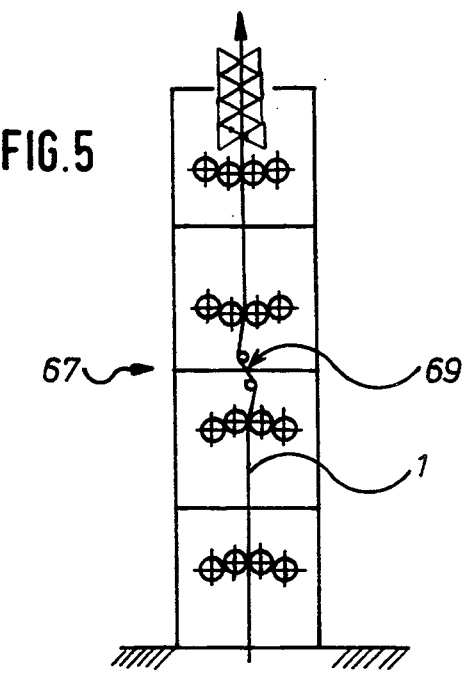
FIG. 5 is a schematic side view of a simplified representation of a rotary offset press using the web stress measuring assembly of the present invention.
Figure 6:
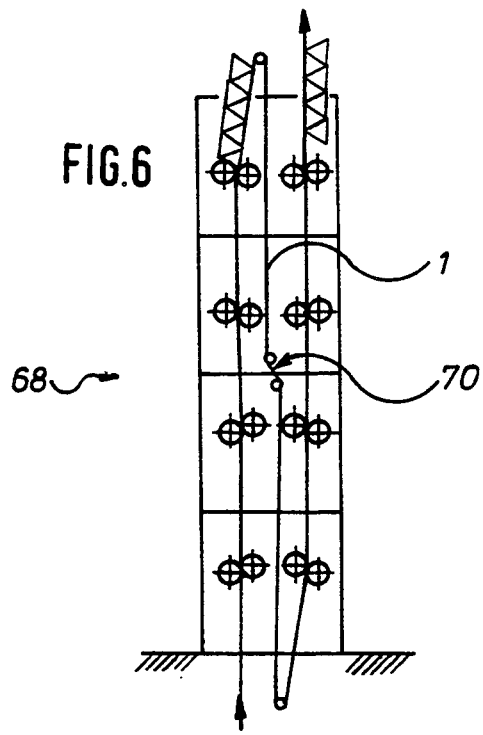
FIG. 6 is a schematic side view of a simplified representation of a flexographic printing press using the web stress measuring assembly of the present invention.

Turning now to FIGS. 5 and 6, there are shown schematic representations of the web stress measuring assembly of the present invention in a web offset press 67 for newspaper printing presses, or in a flexographic printing press 68. In the web offset press 67 the web stress measuring device is shown at 69 while in the flexographic press 68 the web stress measuring device is shown at 70. In FIG. 7, there is shown the deflection of the paper web 1 through an angle $\alpha$, with respect to the vertical, as the web 1 passes through the web stress measuring device 69. This angle of deflection $\alpha$ is generally about 6°. This angle of deflection also applies to the paper web 1 as it travels through the other depicted web stress measuring devices 13, 14 or 70.

It will be understood that the distance "b" between the two tubular members 33 and 34 in the web stress measuring device 13, as shown in FIGS. 2 and 3, is selected to be less than the natural frequency of the paper web 1. This distance is also below the natural frequency of the measuring devices 13, 14, 69, or 70.

While a preferred embodiment of a web stress measuring assembly in accordance with the present invention has been set forth fully and completely hereinabove, it will be apparent to one of skill in the art that a number of changes in, for example, the number of printing units in the printing press, the number of measuring units used, the speed of the paper web travel, and the like can be made without departing from the true spirit and scope of the present invention which is accordingly to be limited only by the following claims.

We claim:

1. A web stress measuring assembly which is usable to measure the stress in a paper web in a web-fed rotary printing press, said web stress measuring assembly comprising:
    first and second supports secured to a press frame on first and second sides of a path of paper web travel;
    first support arms secured to said first and second supports and having free ends extending upstream along said path of paper web travel;
    second support arms secured to said first and second supports and having free ends extending downstream along said path of paper web travel;
    a first tubular member having air nozzles secured between said upstream ends of said first support arms;
    a second tubular member having air nozzles secured between said downstream ends of said second support arms, a paper web traveling along said path of paper web travel, passing alternatingly over and under said first and second tubular members; and means for measuring flexure in said first and second support arms caused by a paper web traveling over and under said first and second tubular members and evaluating said flexure to determine stress in a paper web.

2. The web stress measuring assembly of claim 1 wherein compressed air is provided to said air nozzles to provide an air cushion.

3. The web stress measuring assembly of claim 2 wherein said compressed air is supplied to said tubular members through air supply hoses from an air supply.

4. The web stress measuring assembly of claim 1 wherein said means for measuring flexure in said first and second support arms includes strain gauges secured to said support arms first and second intermediate said first and second supports and said free upstream and downstream ends.

5. The web stress measuring assembly of claim 1 wherein said means for measuring flexure in said first and second support arms includes inductive travel pickups secured to said supports and positioned adjacent said upstream and downstream free ends of said first and second support arms.

6. The web stress measuring assembly of claim 1 wherein said path of paper web travel has a wrap angle of 20° to 30° about said first and second tubular members.

* * * * *

UNITED STATES PATENT AND TRADEMARK OFFICE
CERTIFICATE OF CORRECTION

PATENT NO. : 5,357,812

DATED : October 25, 1994

INVENTOR(S) : Thomas Kubert et al.

It is certified that error appears in the above-identified patent and that said Letters Patent is hereby corrected as shown below:

Column 7, line 1, after "and" insert --second--; and line 2, before "arms" cancel "second".

Column 8, line 1, after "said" (first occurrence) insert

--first and second-- and after "arms" cancel "first and second"; and line 8, after "said" (first occurrence) insert --free-- and after "downstream" cancel "free".

Signed and Sealed this

Twenty-first Day of February, 1995

Attest:

BRUCE LEHMAN

*Attesting Officer*     *Commissioner of Patents and Trademarks*